United States Patent [19]

Goulooze

[11] Patent Number: 5,054,295
[45] Date of Patent: Oct. 8, 1991

[54] TRANSPORT WITH VARIABLE VOLUME, INDEPENDENTLY COOLED COMPARTMENTS

[76] Inventor: Gene D. Goulooze, 3129 E. Gatehouse S.E., Grand Rapids, Mich. 49546

[21] Appl. No.: 570,418

[22] Filed: Aug. 21, 1990

[51] Int. Cl.[5] ............................................... B60H 1/32
[52] U.S. Cl. ......................................... 62/239; 98/6; 52/64; 296/241; 410/127
[58] Field of Search ............... 62/239; 98/6; 296/24.1; 410/126, 127, 129, 130, 132, 140, 143–145, 150; 52/64, 238.1; 414/529

[56] References Cited

U.S. PATENT DOCUMENTS

| | | | |
|---|---|---|---|
| 2,255,511 | 9/1941 | Muller | 52/238.1 X |
| 2,677,244 | 5/1954 | Wehby | 62/239 X |
| 3,287,925 | 11/1966 | Fane et al. | 62/239 X |
| 4,459,821 | 7/1984 | Cabell et al. | 62/239 |
| 4,505,126 | 3/1985 | Jones et al. | 62/239 |
| 4,726,196 | 2/1988 | Zajic | 62/239 |
| 4,880,342 | 11/1989 | Pradovic | 410/127 X |
| 4,887,937 | 12/1989 | Thunnissen | 414/529 X |

Primary Examiner—William E. Tapolcai
Attorney, Agent, or Firm—Dykema Gossett

[57] ABSTRACT

Transport with Variable Volume Cooperatively Independently Cooled Compartments includes a transport body that has a conventional cooling and refrigerator unit mounted on the front wall and ceiling. The cooling unit has conditioned air outlets and a return air inlet. The ceiling has simple air conducting channels that conduct conditioned air to central outlets which are situated generally centrally of the transport body. A central wall extends between the ceiling and the floor and has a door or doors. Bulkheads are provided to divide the transport into variable volume compartments defined as a freezer compartment, a chilling compartment, and an ambient temperature compartment. Conditioned air is exhaused into the freezer compartment and into the chilling compartment. Heaters in the chilling compartment and the ambient temperature compartment control the temperatures therein. The heaters and exhaust fans are thermostatically controlled. An apparatus for loading and unloading food products into the transport includes a lift gate and lift truck combination. A method for loading and unloading food products into the transport includes removing bulkheads and loading food items on pallets and maneuvering the pallets along longitudinal and horizontal roller tracks into and out of the frozen food compartment and the chilled food compartment and placing loads into the ambient temperature compartment.

10 Claims, 3 Drawing Sheets

TRANSPORT WITH VARIABLE VOLUME, INDEPENDENTLY COOLED COMPARTMENTS

FIELD OF THE INVENTION

The present invention relates to transports for ambient temperature produce, refrigerated fresh produce, and frozen foods in a refrigerated state and more particularly to transports for simultaneously transporting fresh produce, refrigerated fresh produce, and frozen foods. Still more particularly, the present invention relates to transports having multiple compartments in which independent temperature environments may be maintained. Yet more particularly, the present invention relates to transports having multiple compartments in which independent temperature environments may be maintained by a cooperation of one compartment with another.

BACKGROUND OF THE INVENTION

Food suppliers find it necessary to transport a range of food inventories from warehouses to stores or supermarkets. The food is transported in a "transport", such as a trailer or semi-trailer, which is pulled along a highway by truck or tractor. Supplying such food inventories to stores is more efficient when a substantial inventory is transported and delivered to each store at a time, rather than to transport certain food items, which form a part of an inventory, to each store on a delivery route and then returning to each store with other food items to complete the inventory of each store. The efficiency is enhanced by proper loading of the inventory for each store to allow for a minimum of time for unloading. This is usually accomplished by loading food items first that are to be taken off last. Loading and unloading thus proceeds according to the itinerary of the transport along its delivery route.

But while unloading an inventory at one store at a time has its efficiencies, it poses the problem of transporting differing food items that require differing temperature environments during transportation. In particular, food suppliers that furnish the range of food items, including ambient temperature foods, fresh produce, chilled produce and processed foods, and frozen foods, must transport the range of types of food products that require two, perhaps three different temperature environments during transporting. Under certain outside conditions, an outside ambient temperature might provide a desired temperature environment for fresh produce and other food stuffs, but may be too warm for certain foods requiring low but nonfreezing temperatures which preserve the desirable characteristics of perishable foods for reasonable periods of time. Still other foods must be frozen to keep for long periods of time and to markedly reduce ensymatic actions. Thus, the food transport for a range of inventory must have at least two, perhaps three compartments.

Concomitant with the problem of providing compartments for transporting foods at different temperatures is the problem of loading the foods for efficient unloading. Typically transports have a rear door and, if there are more than one temperature zones in the transport, one or two side doors. It is desirable that foods may be pulled from any available door at any one stop, so that the itinerary may be dictated by the proximity of stops rather than by which stops have back-in loading docks and so should be unloaded through a rear door and which stops must be unloaded curb-side and so should be unloaded through a side door.

Loading also poses other problems. It is customary to move produce or frozen foods out of the cooling chamber or freezer, and by fork lift, move the produce or frozen foods through ambient atmosphere into the refrigerated transport. Usually pallets support the produce or frozen foods for lifting and loading the produce or frozen foods. The pallets must be supported above the floor so that the forks of the fork lift may be slid underneath the pallet. Standard pallets have parallel runners or "skids" attached beneath to support the pallet above the floor. But standard pallets must usually be set upon the floor of the transport at the door of the transport, because the fork lift usually cannot be maneuvered into a substantially loaded truck. The pallets then must be pushed or slid across the floor with significant effort to overcome substantial resistance by friction. Of course, sliding pallets cause substantial wear to the floor of the transport.

PRIOR ART

Refrigerator transports having at least two compartments are known to those of ordinary skill in the art. One such transport is the Model A454 Super Grocer ® manufactured by American Trailers ® of Lewisville, Tex. Such a trailer has an adjustable 1, 2, or three compartments for frozen, chilled or outside ambient temperatures. The compartments are situated one in front of another from front to rear of the trailer, each compartment occupying a volume defined substantially by the height of the trailer, the width of the trailer and a portion of the length of the trailer. The coldest compartment is located at the front of the trailer at an opposite end of the trailer from the rear door or doors, where the warmest compartment is situated. In between is a chilled air compartment. The compartments may be varied in volume by use of insulated bulkheads as walls to separate compartments. The bulkheads have flexible edges that are pressed into intimate sealing contact with the walls, floor, and ceiling of the interior of the trailer when the bulkheads are forced into a standing position perpendicular with the walls, the floor, and ceiling. Thus the bulkheads may be disposed anywhere along the length of the trailer to vary the volume of the three compartments. A small frozen load therefore may be placed within a relatively small frozen food compartment when the wall separating the frozen food compartment from the chilled food compartment is spaced relatively close to the front wall of the trailer.

In the Model A454 Super Grocer ®, cold air from the frozen compartment is circulated into the chilled compartment through a ceiling conduit unit and alternates with a thermostatically controlled heating unit to regulate the temperature in the chilled compartment. Likewise, a thermostatically controlled heating unit may be used to regulate the temperature in the ambient compartment if the ambient temperature proves too cold.

With the apparent advantages of the Model A454 Super Grocer ® are certain shortcomings. One shortcoming is that the volume reduction of the compartments is limited by the significant width of the trailer. Another is that unloading the frozen compartment is practically limited to a side door located near the front of the trailer. Finally, the overhead space is limited by the position of the overhead conduits.

Means other than standard pallets are used to move food items in the truck. One such means that is particularly effective is the Loadmaker ™ Roll O Matic ™ system. A simple flat pallet, having no runners, is used with an aluminum channel floor. A lifting device with handle rolls or slides within the channels. A lifting element is effected to elevate the pallet at least a fraction of an inch above the channel floor so that it may be rolled into position. The system is oriented to move the pallets from front to rear and vice versa, but not in a lateral direction. This is disadvantageous when the pallet is unloaded through one of the side doors of the transport as dictated by a particular docking architecture.

SUMMARY OF THE INVENTION

According to the present invention, a transport with variable volume cooperatively independently cooled compartments includes a transport body that has a left sidewall with at least one side door, a right sidewall, a roof, a floor, a front wall, and a roll-up rear door.

A conventional cooling and refrigerator unit is mounted on the front wall and ceiling of the transport body. The cooling unit has conditioned air outlets and a return air inlet. The ceiling has simple air conducting channels that extend from the cooling unit to an outlet disposed generally centrally of the transport body. The air conducting channels conduct conditioned air to the central outlets.

An insulated auxiliary wall is disposed a few inches in front of the front wall as necessary to isolate structure from the cooling unit. A central wall extends between the ceiling and the floor from the front auxiliary wall structure to a central wall end at the downstream end of the air conducting terminals. The central wall has a door opening from one side of the central wall to the other side of central wall. Preferably, the opening is situated generally close to the central wall end. A door is closable over the door opening. The door and central wall, as well as the transport body, are insulated.

The floor has parallel, longitudinal roller channels or roller tracks extending from front to rear of the transport body. Jack-like mechanisms are insertable into the roller tracks to lift rollers or "skates" in the roller tracks, so that the rollers they can rollably support flat pallets, set over the roller tracks, above the floor. Transverse roller tracks extend across the floor between the left sidewall and the right sidewall, through the door opening of the central wall. The transverse tracks intersect with the longitudinal tracks.

According to another aspect of the invention, bulkheads are provided to divide the transport into variable volume compartments. The bulkheads may be spaced perpendicular to the longitudinal axis of the transport body at different intervals to vary the volume of compartments between the bulkheads and between a bulkhead and the front wall or the rear door. As distinct from conventional uses of movable bulkheads, each bulkhead of the present invention is door-sized rather than wall-sized. When both bulkheads are in place, at least three compartments are defined for the transport.

Preferably, the three compartments are defined as a frozen compartment on one side of the central wall, a chilled compartment on the other side of the central wall, and an ambient compartment between the bulkheads and the door closed over the rear opening of the transport.

The central wall has exhaust fans in the central wall to exhaust air from the freezer compartment into the chilled compartment. Heaters are provided in the chilled compartment and the ambient compartment. A thermostatic temperature control unit is situated in the chilled compartment and, preferably in the ambient compartment. The heaters, exhaust fans in the central outlets, and the exhaust fan in the central wall are controlled by a temperature control unit. Accordingly, the freezer unit is kept at temperatures near 0° Fahrenheit by constant exhausting and circulating conditioned air, the chilled compartment is kept at a desired temperature generally between 40° and 50°, by exhausting of conditioned air from the freezer compartment into the chilled compartment, and/or by exhausting conditioned air from the central outlet and, alternatively, warming up the air by a heater. The ambient temperature is not ordinarily conditioned, but on particularly warm days, air from the chilled compartment may lower the temperature some, and on particularly cold days, the air of the ambient compartment may be warmed up by a heater.

The invention includes mechanisms and methods for loading and unloading food products. The methods that include removing bulkheads and loading food items on pallets and maneuvering the pallets along longitudinal and horizontal tracks into the frozen food compartment and the chilled food compartment and placing loads into the ambient compartment.

OBJECTS OF THE INVENTION

Accordingly, it is one object of the present invention to provide a transport with independently cooled compartments that have volumes which may be reduced less than the reduced volumes allowed by compartments spanning the width of a transport.

It is another object of the present invention to provide a transport that allows for several compartments that may be conveniently unloaded from either the side or the back of the transport.

It is yet another object of the present invention to provide a transport that allows for efficient circulation of cold air from one compartment to another without the necessity of overhead conduits.

Still yet another object of the present invention is to provide a transport that has a convenient system for loading and unloading pallets through a rear or side door of a transport.

These and other objects of the present invention will be realized in connection with the soon to be disclosed specification and the associated drawings, a brief description of which is as follows:

DETAILED DESCRIPTION OF THE PREFERRED EMBODIMENT

Figure 1:
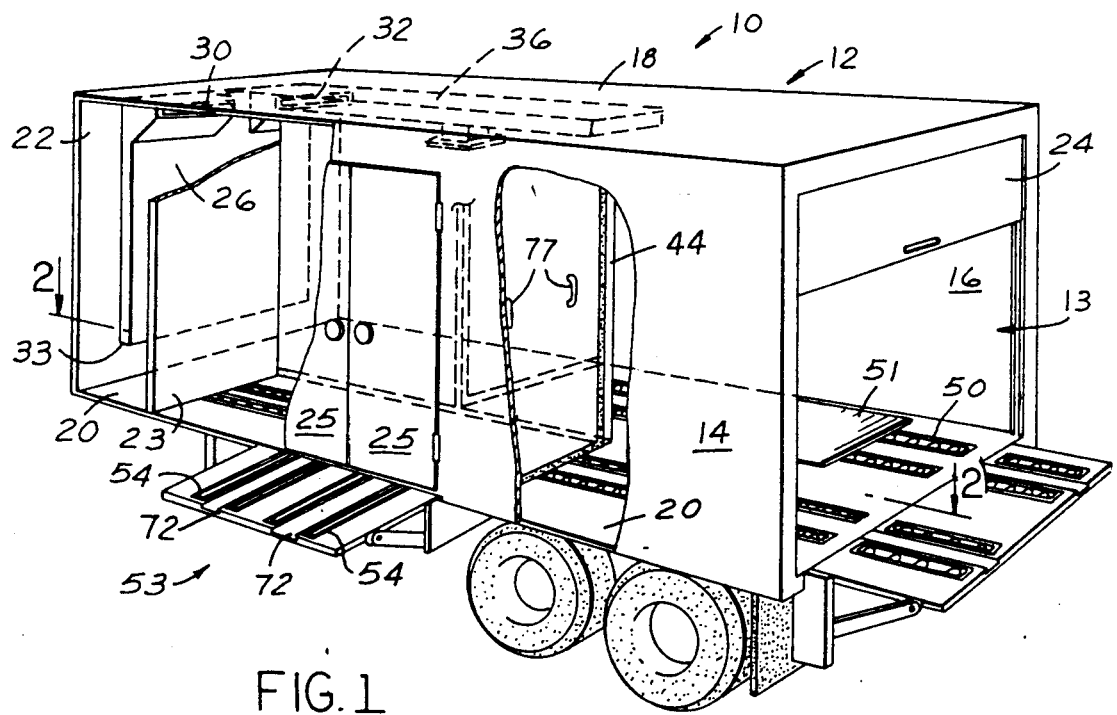
FIG. 1 is a cut-away perspective view, somewhat from above, of a transport in which the present invention might be used.

Referring now specifically to FIG. 1 of the drawings while also using the other drawings with like references, the numeral 10 generally designates a transport in accordance with the present invention. In the preferred embodiment, the transport 10 is a semi-trailer. Transport 10 includes a transport body 12 which has a rear opening 13. The transport body 12 includes a left sidewall 14, a right sidewall 16, roof 18, a floor 20, a front transport body wall 22, and a roll-up rear door 24. Rear door 24 covers rear opening 13. Rear door 24 forms a transport body rear wall in the preferred embodiment, but other door means, for example two doors that swing open, may be used to cover rear opening 13. The rear door or doors may be set in a rear wall that has a large rear opening 13, such that the door or doors cover rear opening 13. At least one side door 25, preferably a double door, is disposed in left sidewall 14, generally centrally thereof.

Figure 3:
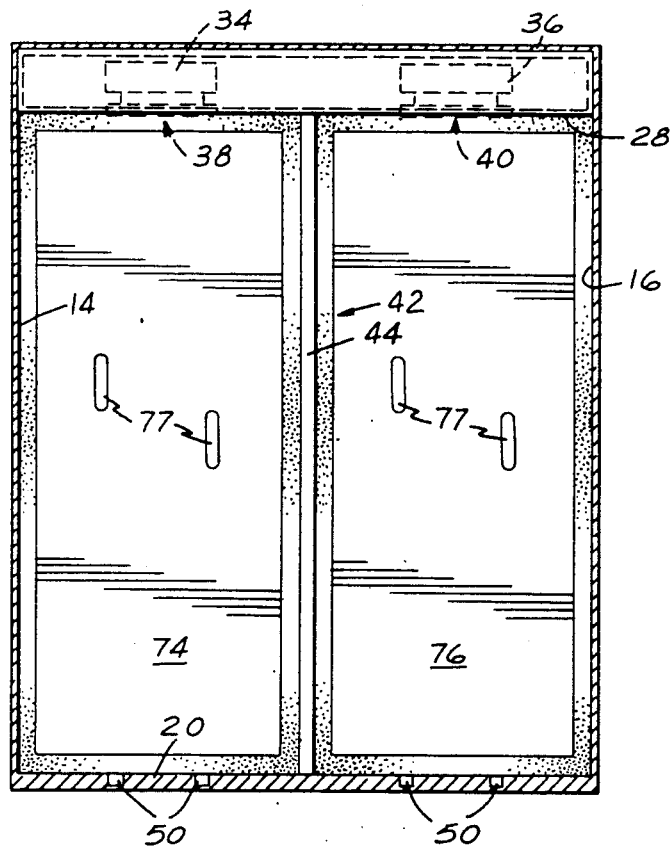
FIG. 3 is a section view taken in the direction of arrows 3—3 of FIG. 4.
Figure 4:
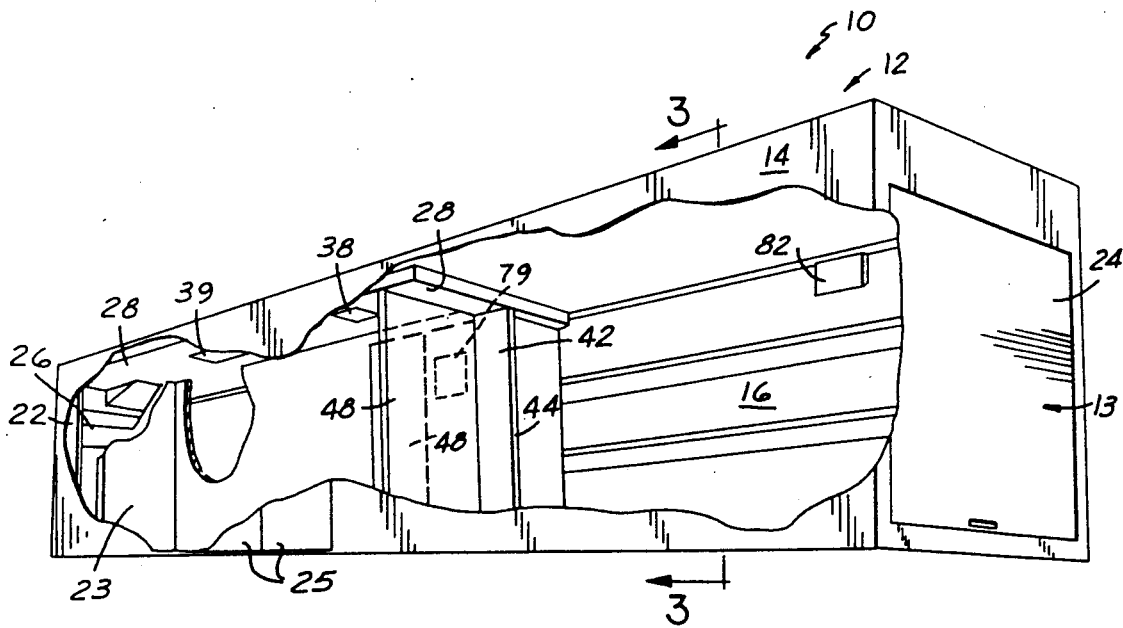
FIG. 4 is a cut-away perspective view, somewhat from below, of a transport in which the present invention might be used.

A conventional evaporator unit 26, which includes a heat exchanger assembly to provide refrigerating means, is mounted on front transport body wall 22 proximate a ceiling 28, which is better viewed in FIG. 4 and which is beneath roof 18. Those of ordinary skill in the art will appreciate that evaporator unit 26 includes equipment mounted outside of transport body 12, on the front side of transport body wall 22 which is the side opposite the back side of front transport body wall 22 as shown in FIGS. 1 and 4. The specific structure of evaporator unit 26 is not a limitation of the invention, but as shown, evaporator unit 26 has conditioned air outlets 30 and 32 and a central downwardly opening return air inlet 33. Between roof 18 and ceiling 28 are air conducting channels 34 and 36, only one of which is shown in FIG. 1 but both are located in FIG. 3. As can be seen in FIG. 1, air conducting channel 36 extends from air outlet 32 of evaporator unit 26 to outlet 40 which is situated generally centrally of transport body 12. Although not shown in FIG. 1, air conducting channel 34 extends from air outlet 30 of evaporator unit 26 to outlet 38 which is situated generally centrally of transport body 12. Accordingly, air conducting channels 34 and 36 conduct conditioned air to central outlets 38 and 40, which are situated generally at the downstream end of air conducting channels 34 and 36. Associated with central outlets 38 and 40 are central inlets 39 and 41, one of which is shown, central inlet 39, in FIG. 4. Central outlets 38 and 40 and central inlets 39 and 41 are located in ceiling 28 as shown in phantom in FIG. 2.

A few inches in front of front wall 22 is an insulated front auxiliary wall 23. The auxiliary wall 23 is not essential to the invention, but serves to accommodate the structure of evaporator unit 26, particularly a unit having an air circulation system that is associated with the full width of transport body 12. What is essential to the invention is a central wall 42 that extends between ceiling 28 and floor 20, from auxiliary wall 23 to a central wall end 44. Central wall end 44 is situated generally at the downstream end of air conducting channels 34 and 36. Central wall 42 has an opening 46, preferably wide enough for a double door, from one side of central wall 42 to the other side of central wall 42. Preferably opening 46 is situated generally just forward of central wall end 44. A door 48, preferably a double door, is closable over opening 46. Door 48 and central wall 42, as well as transport body 12 are insulated.

According to another aspect of the invention, rectangular flat or planar pallets 51 are set upon floor 20 of transport 10 to maneuver loads about within Transport 10. A load of food products, in a box, crate, or bundle is set upon a pallet 51. Floor 20 has parallel, longitudinal roller channels or roller tracks 50 extending from front to rear of transport body 12. Roller channels or roller tracks 50 are characterized by having a multiplicity of rollers or "skates" that align tracks 50 to rotate in the direction of the extension of each track 50. The skates may be retractable on a structure that presents itself when a jack-like mechanism is inserted into a track 50 and pivoted to lift the rollers or may be a retractable roller system that presents itself when air from a truck air system inflates lengths of fire hose in the channel or track 50 beneath the rollers, such as "Retract -A Roll's" by Ancra International of Hawthorne, Calif. This type of mechanism is known to those of ordinary skill in the art, who also know that loads may be set upon the rollers and thereby pushed to roll across the floor in the direction in which the roller tracks 50 extend. Accordingly, in the present invention, pallets 51 are set upon the floor 20, whereby the rollers are presented to allow pallets 51 to be maneuvered or rolled in the direction in which longitudinal roller tracks 50 extend.

Figure 2:
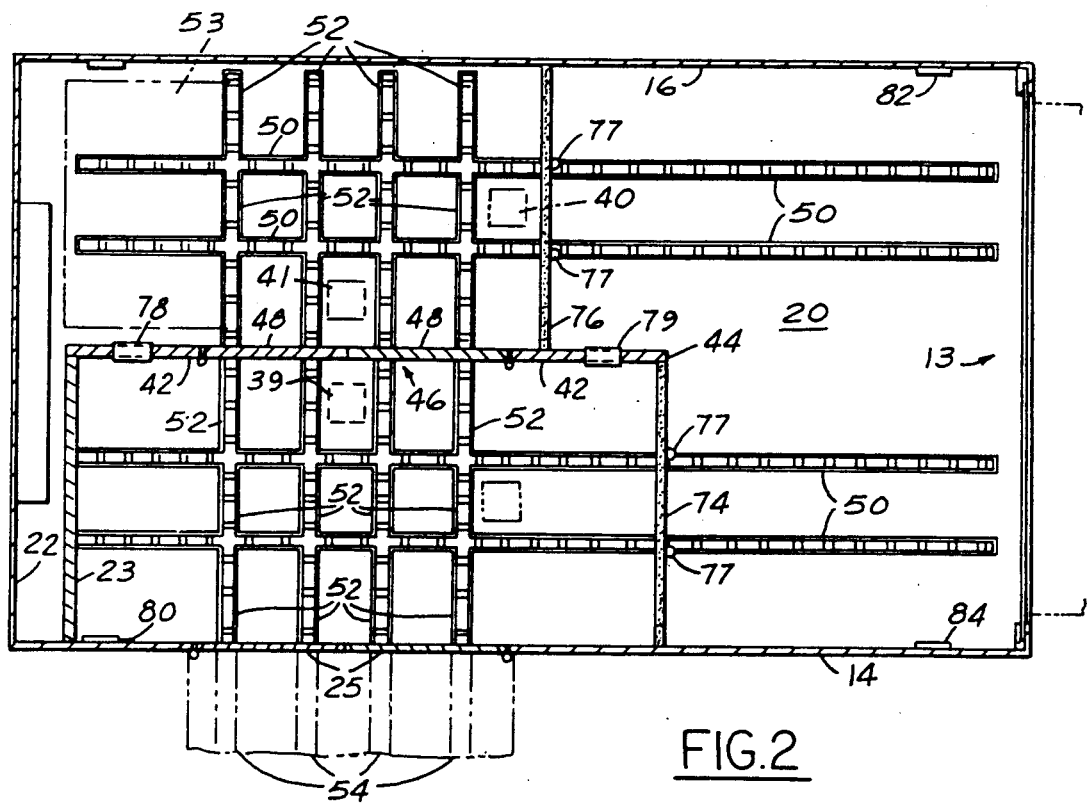
FIG. 2 is a section view taken in the direction of arrows 2—2 of FIG. 1.

According to the present invention, an improvement to the roller track and pallet system comprises transverse channels or roller tracks 52 extending across floor 20 between left sidewall 14 and right sidewall 16, through opening 46 covered by double door 48, all of which is indicated in FIG. 2. Transverse roller tracks 52 intersect with longitudinal roller tracks 50. Pallets 51 may be maneuvered in the direction in which transverse roller tracks 52 extend in the manner they are maneuvered in the direction in which longitudinal roller tracks 50 extend. Thus a load on a pallet 51 may be maneuvered throughout transport body 12. For example, a load on a pallet 51 may be maneuvered from opening 13, along the roller tracks 50 that are more proximate right sidewall 16, to front wall structure 22 or to transverse roller tracks 52, and then along roller tracks 52 to side door 25 or to the longitudinal roller tracks 50 more proximate left side wall 14.

Lift gates 53 are operatively connected to transport 10 at the double side door 25 and at rear opening 13. Each lift gate 53 is hydraulically an/or electrically actuated from a control panel that is not shown. Each lift gate 53 is constructed in a manner known in the art. Each lift gate 53 is actuated to be moved to and from a position at which the lift gate 53 is beneath floor 20 of transport body 12 to a position at which the lift gate 53 is generally in planar registry with floor 20. When a lift gate 53 is in the latter position, it is an extension of floor 20.

Each lift gate 53 has roller tracks 54 as does floor 20. Roller tracks 54 align with the roller tracks 50 or 52 which are more proximate to roller tracks 50, when lift gate 53 having roller tracks 50 is in the position at which it is an extension of floor 20. Thus, in the case of lift gate 53 at double side door 25, roller tracks 54 align with transverse roller tracks 52. In the case of lift gate 53 at rear opening 13, roller tracks 54 align with longitudinal roller tracks 50.

Figure 5:
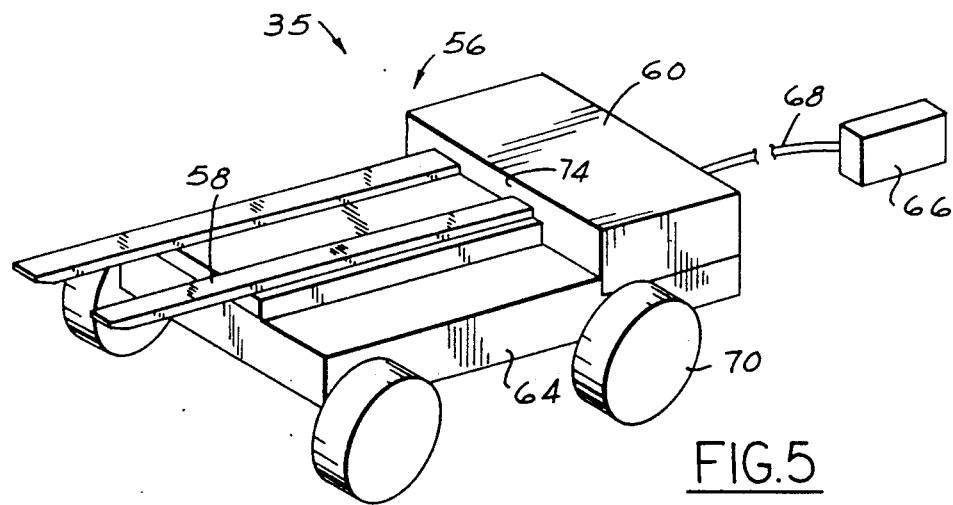
FIG. 5 is a perspective view of a fork lift loader truck especially adapted for a transport in accordance with the present invention.
Figure 6:
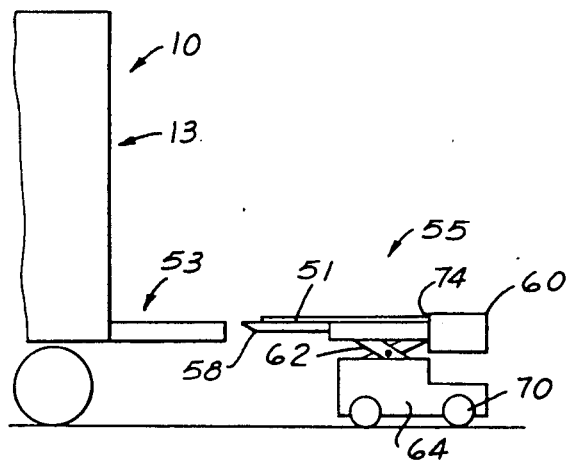
FIG. 6 is a schematic elevation of the fork lift loader of FIG. 5 in use away from a lift gate of the transport.
Figure 7:
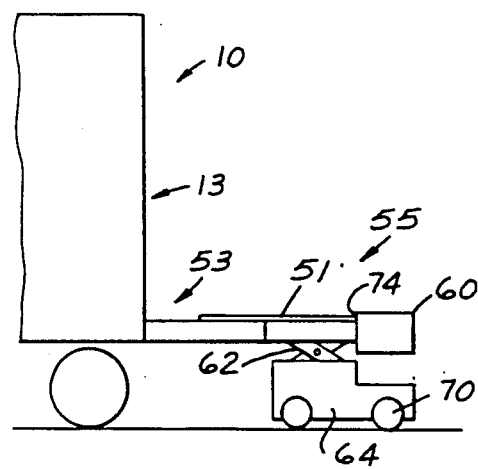
FIG. 7 is a schematic elevation of the fork lift loader of FIG. 5 engaged with a lift gate of the transport.

According to still another aspect of the invention, a robot lift truck 55 is used in combination with lift gate 53 to load loaded pallets 51 onto floor 20 of transport body 12. Robot lift truck 55, which is shown in FIGS. 5-7, comprises a lift bed 56 that includes two forks 58, which are connected to a stop 60. Lift bed 56 sits upon elevating means 62 which includes a lifting mechanism such as the scissors mechanism shown in FIGS. 5 and 7. Elevating means 62 also includes an electrical or mechanical mechanism for actuating the lifting mechanism. The elevating means is disposed substantially within a housing 64. A control device 66 is linked electrically or hydraulically by line 68, to elevating means 62. Control device 66 is also used to drive robot lift truck 55 which may be steered about by controlling wheels 70. A person may control robot lift truck 55 by using the control device 66 while walking beside or behind robot lift truck 55.

Robot lift truck 55 cooperates with lift gate 53 to load loaded pallets 51 thereon. As can be seen in FIG. 1, lift gate 53 has female fork fittings 72 adapted to receive forks 58 below the plane of lift gate 53 that goes aligns in the plane of floor 20. Referring now in particular to FIG. 6, lift bed 56 of robot lift truck 55, with a pallet 51 thereon, is elevated by elevating means 62, which is controlled by control device 66, to align parallel in the plane of lift gate 53, when lift gate 53 is in a position that is substantially level with floor 20 of transport 10. Robot lift truck 55 is then moved up to lift gate 53 with forks 58 inserted into female fork fittings 72. A wall 74 of stop 60 keeps pallet 51 from sliding back on robot lift truck 55. The rollers of tracks 54 are presented underneath pallet 51 so that it may be rolled onto transverse tracks 52, when lift gate 53 at double side door 25 is used, or onto longitudinal tracks 50, when lift gate 53 at rear opening 13 is used, thereafter to be maneuvered to a desired location with transport body 12.

According to still yet another aspect of the invention, bulkheads 74 and 76 are provided to divide the transport 10 into variable volume compartments. The bulkheads 74 and 76 may be spaced perpendicular to the longitudinal axis of the transport body 12 at different intervals to vary the volume of compartments between bulkheads 74 and 76 and between a bulkhead 74 or 76 and the front wall 22 or the rear door 24. As distinct from conventional uses of movable bulkheads, each bulkhead 74 or 76 of the present invention is door-sized rather than wall-sized, as the bulkhead 74 or 76 is pressed into position between left sidewall 14, ceiling 28, floor 20, and central wall 42 or between right sidewall 16, ceiling 28, floor 20, and central wall 42. Manipulating the bulkheads 54 and 76 into position is facilitated by lifting handle straps 77 shown in FIG. 3. When both bulkheads 74 and 76 are in place, at least three compartments are defined for transport 10.

Preferably, the three compartments are defined as follows: On one side of central wall 42, in the present invention, the right side, is a freezer compartment bounded by right sidewall 16, ceiling 28, floor 20, and central wall 42. On the other side of central wall 42, in the present invention, the left side, is a chiller compartment bounded by left sidewall 14, ceiling 28, floor 20, and central wall 42. Between, on a forward side, the bulkheads 74 and 76 and central wall end 44 and, on a rearward side, rear door 24 is an ambient temperature compartment.

According yet still to another aspect of the present invention, central wall 42 has exhaust fans 78 and 79, in central wall 42, as shown in FIG. 2 (only exhaust fan 79 is located in FIG. 4). Exhaust fans 78 and 79 exhaust air from the freezer compartment into the chiller compartment. Heaters 80 and 82 are provided in the chiller compartment and the ambient temperature compartment. A thermostatic temperature control unit 84 is situated in the chiller compartment and, preferably in the ambient temperature compartment. The heaters 80 and 82, exhaust fans in central outlets 38 and 40, and exhaust fan 78 and 79 are controlled by temperature control units 84. The central outlets 38 and 40 and central inlets 39 and 41, the exhaust fan 78 and 79, and the heaters 80 and 82 provide airflow control means for the transport 10. Accordingly, the freezer unit is kept at temperatures near 0° Fahrenheit by constant exhausting and circulating conditioned air from air outlets 28 and 30 and from central outlet 40. The chilled compartment is kept at a desired temperature, preferably 38°-50° F., by exhausting of conditioned air from the freezer compartment into the chilled compartment by exhaust fan 78 and/or by exhausting conditioned air from central outlet 38 and, alternatively, warming up the air by heater 60. The ambient temperature is not ordinarily conditioned, but on particularly warm days air from the chilled compartment through exhaust fan 79 may lower the temperature some, and on particularly cold days the air of the ambient compartment may be warmed up by heater 62.

It is to be appreciated that with the placement of exhaust fans 78 and 79 in central wall 42, central outlets 38 and 40 and central inlets 39 and 41 may be eliminated. This would also mean that ceiling 28 and the duct work leading to central outlets 38 and 40 and central inlets 39 and 41 could be eliminated, which would allow for more head room in tranport body 12. The conditioned air outlets 30 and 32 and the central downwardly opening return air inlet 33 of evaporator unit 26 would be sufficient to supply the conditioned air that would be pulled through exhaust fan 78 into the chiller compartment and eventually through exhaust fan 79 into the ambient compartment. This is may be seen by referring to FIG. 2.

The present invention includes a method for loading and unloading food products by a method that includes removing bulkhead 74 and loading frozen food items on a pallet and maneuvering the pallet along longitudinal roller tracks 50 into the frozen food compartment, the pallets to be unloaded last being placed in the forwardmost portion of the frozen food compartment. The method also includes removing bulkhead 76 and loading chilled food items on a pallet and maneuvering the pallet along a longitudinal roller tracks 50 into the chilled food compartment, the pallets to be unloaded last being placed in the forwardmost portion of the chilled food compartment. Finally, the method includes placing loads into the ambient compartment.

A second method includes opening side door 25 and door 48, loading frozen food items onto a pallet and maneuvering the pallet along transverse roller tracks 52 through opening 46 into the frozen food compartment, changing direction to maneuver the pallet along longitudinal roller tracks 50 so that the pallets to be unloaded last can be placed in the forwardmost portion of the frozen food compartment. The alternative method also includes closing door 48 and loading chilled food items on a pallet and maneuvering the pallet along transverse roller tracks 52 into the chilled food compartment, changing direction to maneuver the pallet along longitudinal roller tracks 50 so that the pallets to be unloaded last can be placed in the forwardmost portion of the chilled food compartment. Finally, the method includes removing bulkhead 74 and placing loads into the ambient compartment.

A third method includes a combination of the steps of the first two described methods, according to which door, side door 25 or rear door 24 is convenient to loading pallets.

I claim:

1. A transport with variable volume, independently cooled storage compartments, comprising:
    a transport body having a front wall structure, a left side wall, a right side wall, and a rear opening, all of which bound the interior of said transport body;
    a center wall structure extending from said front wall structure into said interior to define at least two storage spaces, two of said storage spaces each disposed between said center wall structure and a side wall;
    at least one bulkhead means disposed within said interior generally perpendicular to, between, and in intimate contact with said center wall and a side wall, said at least one bulkhead means being slidable toward and away from said front wall structure within at least one of said storage spaces, to define at least one variable volume compartment between said front wall structure and said at least one bulkhead;
    flow control means associated with each storage space for controlling air flow into each said space and into said at least one variable volume compartment; and
    refrigerating means to cool air controlled by said air control means.

2. The transport of claim 1, wherein said center wall has disposed therein a central wall door communicating between each side of said center wall structure.

3. The transport of claim 2, wherein said center wall structure extends from said front wall structure to a wall end and said at least two storage spaces are at least three storage spaces, one storage space being between said wall end and said rear opening.

4. The transport of claim 3, wherein said at least one bulkhead means is at least two bulkhead means, at least one bulkhead being disposed generally perpendicular to, between, and in intimate contact with said center wall and said left side wall and at least one bulkhead being disposed generally perpendicular to, between, and in intimate contact with said center wall and said right side wall, and said at least one variable volume compartment is at least two variable volume compartments, at least one variable volume compartment being on each side of said center wall structure.

5. The transport of claim 4, further comprising door means to cover said rear opening.

6. The transport of claim 5, further comprising a side wall opening and door means to cover said side wall opening.

7. The transport of claim 5, wherein said at least two variable volume compartments are at least three variable compartments, one of said variable compartments including said one storage space between said wall end and said rear opening and extending into at least one of said two storage spaces disposed between said center wall structure and a side wall.

8. The transport of claim 1, further comprising door means to cover said rear opening.

9. The transport of claim 2, further comprising a floor in said interior, said floor including longitudinal roller tracks extending from proximate said from door structure to said rear opening, said roller tracks for accommodating at least one jack insertable therein to lift flat pallets set upon the floor.

10. The transport of claim 9, wherein said floor includes transverse roller tracks extending across said floor from proximate said left wall to said right wall, said roller tracks extending beneath said central wall door and said transverse roller tracks intersecting said longitudinal roller tracks.

* * * * *